United States Patent [19]

Wiek

[11] 4,286,346
[45] Sep. 1, 1981

[54] BOAT SLIPWAY FOR MOBILE OR FIXED SET-UP

[76] Inventor: Eduard Wiek, 16, Horstlindelaan, Enschede, Netherlands

[21] Appl. No.: 58,956

[22] Filed: Jul. 19, 1979

[30] Foreign Application Priority Data

Mar. 28, 1979 [NL] Netherlands ................... 7902412

[51] Int. Cl.³ .................. B60P 3/10; B63B 21/64; B63C 13/001
[52] U.S. Cl. ................................ 9/1.2; 414/477; 296/26; 280/414 R
[58] Field of Search .................. 9/1.2; 296/26; 280/414 R; 414/477, 478, 479, 559

[56] References Cited

U.S. PATENT DOCUMENTS

| 2,809,496 | 10/1957 | Geil | 414/479 |
|---|---|---|---|
| 3,056,520 | 10/1962 | Rutigliano | 414/479 |
| 3,826,391 | 7/1974 | Prince | 414/477 |

FOREIGN PATENT DOCUMENTS 1805894 5/1969 Fed. Rep. of Germany ............... 9/1.2

Primary Examiner—Trygve M. Blix
Assistant Examiner—D. W. Keen
Attorney, Agent, or Firm—Mason, Kolehmainen, Rathburn & Wyss

[57] ABSTRACT

Boat slipway for fixed or mobile set-up, comprising a framework, which can hinge around a horizontal shaft at a right angle to the longitudinal direction of the framework, which shaft is supported by mobile or fixed means, the framework having at least one longitudinally telescopic part, which near its end projecting from the framework is provided with apparatus for connecting the framework with at least one floating body which can keep the framework floating on the water and with which the buoyancy can be adjusted to bring the end of the framework under the surface of the water when a boat is launched or taken out of the water.

7 Claims, 6 Drawing Figures

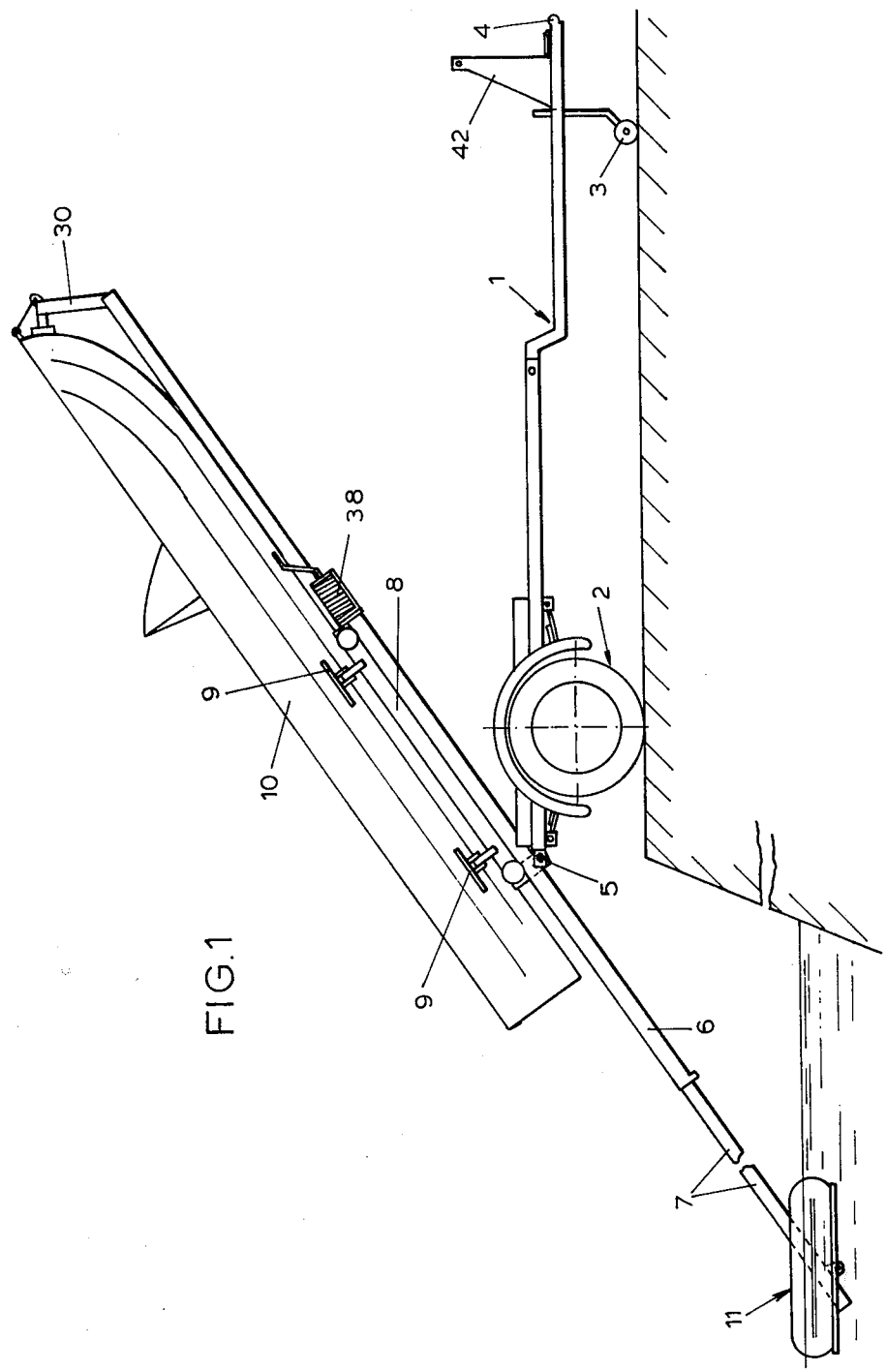

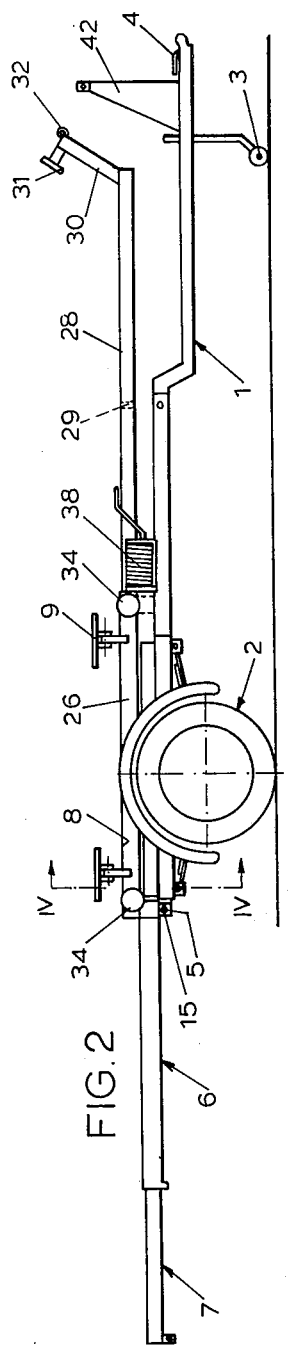
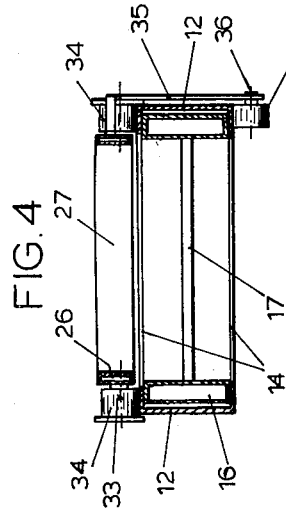
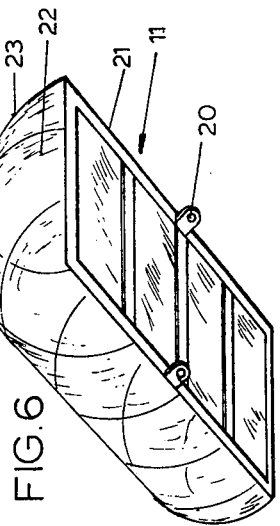
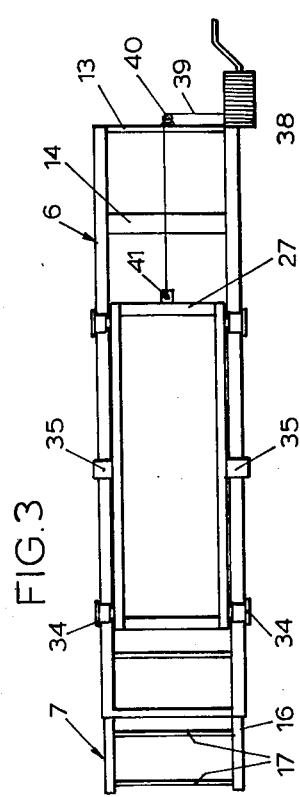
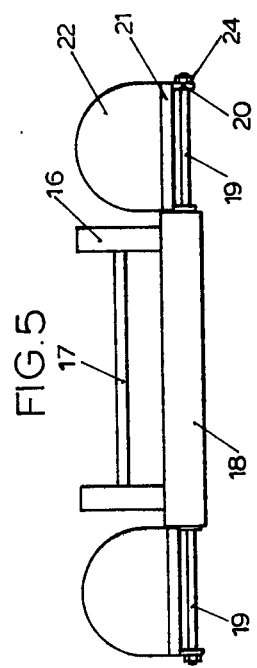

BOAT SLIPWAY FOR MOBILE OR FIXED SET-UP

The invention relates to a boat slipway for mobile or fixed set-up, comprising a framework and provided thereon supporting means for a boat, which framework may be in an almost horizontal position when a boat is supported thereby and which may be swung into a more inclined position for facilitating the bringing of a boat from the slipway into the water or vice versa.

Similar devices, which are usually of the mobile type, are used at a large scale for the transportation of boats behind motor vehicles.

With these known, so-called "slipway trailers" the pole, which can be connected with the towing hook of a motor vehicle, is hinged to a point of the framework, which is provided at some distance from the front end of the framework. When the slipway is put into an inclined position, the front end of the frame work can thereby move upwards with respect to the pole, and this upwards movement may be controlled e.g. by means of a threaded rod. The inclination under which the framework can be brought, is relatively small, among other reasons because in general the trailer will have to remain connected with the towing hook because of the stability of the trailer when the boat is launched. For that reason the pole is not allowed to form too great an angle with the horizontal, as that would mean too great a load on the hinge of the towing hook.

For these reasons such a device can be used only when for launching a boat and taking it out of the water one has the disposal of a gradually sloping bank at an angle of which the variation must be small. When the slope is too small, the motor vehicle will have to be driven too far into the water to make the boat float whereas in the case of a too steep slope a motor vehicle of a heavy weight will have to be available.

With such a slipway trailer the framework will pivot around the supporting point where the axle and the wheels are provided. When this axle is arranged fixed on the shore, a very long framework will be necessary which will have to be carried out very heavily to offer resistance to the high bending loads when a boat is launched or taken out of the water.

The present invention overcomes these drawbacks by providing a boat slipway, which is characterized in that the framework can freely hinge around a shaft and comprises at least one part which is telescopic in the longitudinal direction of the framework, which telescopic part is provided at or near its end which projects from the framework with means for connecting the framework with at least one floating body, in such a way that the end of the framework, even under maximum load, can be kept floating on the water, whereas means are provided for adjusting the buoyancy of the floating body, in such a way that the end of the framework can be brought under the surface of the water when a boat is launched or taken out of the water.

Thus it is obtained that the framework acts as a supporting beam, which is supported near its ends, when a boat is launched or taken out of the water. Thus the bending moments exerted on the framework can be kept small, so that the framework may be of a light construction.

According to a further elaboration of the invention, the boat is placed on an undercarriage which can travel over the framework and the telescopic part thereof.

Thus it can be obtained that the position of the boat with respect to the slipway can easily be modified somewhat for a very gradual displacement of the centre of gravity of the boat with slipway with respect to the shaft, around which the framework can hinge.

In the case of a boat trailer it is desirable, e.g. that the pole rests with a certain force on the towing hook, so that during the ride the boat must be placed on a very determined place of the framework and must be secured in this position. When the telescopic parts of the framework are extended, the weight of these parts may cause the framework to hinge around the hinging shaft before the telescopic part is extended entirely. This can be prevented easily by moving the undercarriage, on which the boat is placed, somewhat to the front in the direction of the towing hook, so that the whole remains balanced. After the telescopic part of the framework has been extended entirely and blocked, the undercarriage is moved in the opposite direction, towards the telescopic part, so that the entire framework with the boat will hinge gradually until the floating body rests on the water. Then the undercarriage with the boat is brought to near the end of the extended part and the buoyancy of the floating body is reduced gradually, so that the end of the framework sinks below the water surface and the boat is freed from the undercarriage. Finally the connection between the boat and the highest point of the undercarriage is detached to free the boat completely from the undercarriage.

An important advantage of the use of an undercarriage on which the boat rests, is that the boat does not need to be displaced over rollers which might exert a considerable load on the hull of the boat, as the shape of the hull changes considerably over its length so that the rollers which first lie against walls that form a certain angle, will later lie against walls that form another angle with one an other. When a boat is drawn onto a boat trailer, considerable loads are therefore exerted normally on the walls of the hull and therefore also on the construction by which the rollers are supported. This is avoided with the device according to the present invention, with which the boat can be supported at the places which are most suitable therefore and which can be preselected. This will preferably be places at which there is a truss of the boat.

According to a preferable embodiment, the undercarriage can travel over the framework by means of four rollers mounted in two pairs behind each other, provided with flanges for guiding the undercarriage in the lateral direction with respect to the framework, whereas the undercarriage is further provided with means which project downwards from the undercarriage and have a part which is bent inwards and partly encloses the framework so as to hold the undercarriage also in the vertical direction with respect to the framework and the telescopic part thereof.

The means which hold the undercarriage in the vertical direction, may be provided near the four rollers, but it is also possible to provide only one means at each side of the undercarriage, approximately between the two rollers provided at that side. Thus it is prevented that the undercarriage can start to turn over with respect to the one set of wheels when a part of the boat, which rests on the undercarriage, starts to float.

According to a preferable embodiment, two floating bodies will be provided, one at each side of the telescopic part of the framework. Thus a certain lateral stability of also the part which floats on the water, of the framework will be assured. Furthermore this reduces the risk that a boat comes into contact with a floating body when it is launched or taken out of the water.

Inflatable air bags can be used as floating bodies. They can be inflated e.g. by means of an air pump which is driven by means of the battery of a motor vehicle.

It is also possible to use floating bodies with rigid walls, in which case one can let water into the floating bodies and press this water out by means of compressed air.

When inflatable air bags are used, each air bag can be secured to the top side of a horizontal framework which by means of eyelets can be slid on a shaft which project laterally from the telescopic part of the framework. In this way the air bags can be mounted easily on the framework and be removed after their use, during the transportation of the device. A further advantage is that the air bag can always turn to the most favourable position with respect to the water surface, whatever the angle of the framework to the water surface may be.

According to a preferable embodiment the framework consists of two U-profiles, of which the legs are directed to each other, and of which at least two opposing legs are connected with each other, whereas parts of the telescopic framework are accommodated in the two U-profiles. Thus a stable construction is obtained which requires little height.

According to a further elaboration of the invention the telescopic part of the framework consists of tubular profiles, preferably with a rectangular cross section, mounted lengthwise, which are connected with each other by means of strips, which are placed on such a distance from each other, that they form the rungs of a ladder, while also the end of the framework near the telescopic section is provided with these rungs.

In this way an easy access is obtained to the boat when it has to be launched or taken out of the water by means of the device.

Although in the above mainly the slipway according to the invention in the form of a boat trailer was discussed, which therefore can be transported behind a motor vehicle, the boat slipway can be used also without a set of wheels. In that case the hinging shaft is secured to the ground by means of a supporting construction.

Such a possibility is of great importance to boat owners who do have the disposal of ground adjacent to a waterway, but who are not allowed to build a landing stage or even moor their boat there.

They can now set up a construction according to the invention on their own ground, so that they can easily launch the boat fom their own ground and take it out of the water after having used it.

Such a possibility exists of course also for wharves for boats, where a device according to the invention can be used for launching boats and taking them out of the water. Such a wharf may then be located at a narrow waterway, as only a part of the waterway will be obstructed for only a short time, namely when boats are launched or taken out of the water. At such a wharf the undercarriage used for launching boats and taking them out of the water, can be carried out in such a way that it can be driven from the slipway onto the shore, so that the boat remains on the same carriage during repairs or storage.

So it is possible to use one single slipway for a large number of boats.

The invention will be explained hereinafter by means of an example of an embodiment shown in the drawing, in which:

FIG. 1 shows a lateral view of a mobile boat slipway according to the present invention, in the position in which the telescopic part of the framework is extended and by means of the floating bodies rests on a water surface as is the case when a boat is being launched or after it has been taken out of the water;

FIG. 2 shows a lateral view of the device according to FIG. 1, in which the framework is in its horizontal position and the telescopic part is extended only slightly, whereas there is no boat on the undercarriage;

FIG. 3 gives a top view of the frame work, with the telescopic part and a part of the undercarriage travelling thereon, as shown in FIG. 2;

FIG. 4 shows a cross section of the framework, the part which is telescopic therein and the undercarriage travelling thereon, approximately along the line IV—IV of FIG. 2;

FIG. 5 shows a rear view of the lower part of the device as shown in FIG. 1, and FIG. 6 gives a perspective view from below of a framework and a floating body mounted thereto.

The device shown in the drawing comprises the chassis 1, which is supported by the set of wheels 2, the auxiliary wheel 3 and the coupling 4. The coupling 4 can be connected with the towing hook (not shown) of a vehicle.

The chassis 1 further comprises a hinging shaft 5, which serves for the hinging support of the framework 6, which is provided with a telescopic part 7. Over the framework 6 and the telescopic part 7 thereof can travel the undercarriage 8, on which the boat 10 is supported by means of supports 9.

To the free end of the telescopic parts 7 can be mounted floating bodies 11, as is shown in particular in FIG. 1.

As is shown in FIGS. 3 and 4, the framework 6 consists of the profiles 12, which are connected with each other at the one end by means of a profile 13 and furthermore by means of strips 14, At the place where the hinging point is provided, such a strip is carried out heavily and provided with eyelets 15 for accommodating the hinging shaft 5 (see FIG. 2).

Within the U-profiles 12 of the framework 6 is provided the telescopic part 7, which consists of two longitudinal tubular profiles 16, which are connected with each other by means of rods 17. As is shown in FIG. 3, the rods 17 may form the rungs of a ladder.

At their outward end, the tubular profiles 16 are connected with each other by means of a profile 18, on which the rods 19 are provided, see FIG. 5. On the rods 19 the eyelets 20 (see FIG. 6) can be slid, which are connected with a framework 21, on which an air bag 22 is provided by means of a net 23. For securing a framework 21 on a rod 19, e.g. this rod 19 may have a threaded end on which a nut 24 can be tightened.

The telescopic part 7 can be secured at a certain place in the framework 6, e.g. by means of a pin construction. It is obvious furthermore, that cams will be provided for preventing the telescopic part 7 from being drawn out of the framework 6, whereas it is assured that the telescopic part 7 is always supported over a certain length by the framework 6.

As shown in FIGS. 2 and 3, the undercarriage 8 consists of two longitudinal tubular profiles 26, which at their ends are connected with each other by the profiles 27.

From the tubular profiles 26 project the profiles 28 (see also FIG. 2) which may be connected with each other by means of profiles 29 and which may approach each other at the ends which are not within the tubular profiles 26 and are connected there by the support 30.

The support 30 may be of the known telescopic construction, so that the V-shaped boat support 31, which is provided at the upper end, can be set at the desired height. The support 30 is provided further with the eyelet 32 to tie a boat in a known way to the support 30.

It will be obvious that the place of the support 30, seen in the longitudinal direction of the undercarriage, can be adapted to the length of the boat by more or less moving the profiles 28 out of the profiles 26. Once the right length has been set, the profiles 28 can be secured with respect to the profiles 26 in a known, not shown way.

Each of the profiles 26 is provided with two shafts 33 (FIG. 4), on the each of which a wheel 34 is provided. By means of the wheels 34 the undercarriage can travel over the framework 6 and over the telescopic part 7 thereof.

To prevent that the undercarriage frees itself from the framework 6 or from the telescopic part 7, square supports 35 are provided on the sides of the undercarriage, which extend themselves around the U-profiles 12 and are provided at the underside with a shaft 36 on which a roller 37 is provided.

For the sake of clearness, FIG. 4 only shows one of these supports 35. It will be obvious that such supports may be provided at the front and rear ends of the undercarriage, but it is also possible to provide at each side of the undercarriage only one support 35, which will then be provided approximately in the middle between two wheels 34.

The travel of the undercarriage takes place by means of a manually operated winch 38, on which a cable 39 can be wound, which runs over a pulley 40 provided on the profile 13 of the framework 6 and from there to the fixation point 41 on a profile 27 of the undercarriage 8.

Finally the chassis 1 is provided with a displaceable support 42, so that during transportation the support 30 or the boat 10 can be connected directly with the chassis 1.

The device works as follows:

After the chassis 1 supported by the set of wheels 2 has been driven to a certain place on the bank, the auxiliary wheel 3 can be lowered so that a too great downward force on the towing hook of the vehicle is prevented anyhow.

After the connection between the boat 10 or the support 32 and the support 42 of the chassis 1 has been undone, the telescopic part 7 is drawn out of the framework 6. The floating bodies 11, shown in FIG. 6, are now secured to the rods 19, as shown in FIG. 5.

When the telescopic part 7 is drawn out, the centre of gravity of the combination, hinging around the shaft 5, would be displaced to the left, as seen in FIG. 1, so that the risk would exist that the whole combination would hinge to the left too fast. In order to prevent this, the undercarriage 8 can be drawn slightly to the front, so upwards, as seen in FIG. 1, by means of the winch 38.

In the extended position of the part 7, it is secured to the framework 6, e.g. by means of pins, and the chassis 1 can now be driven further backwards to the bank. In the position of the chassis 1, as shown approximately in FIG. 1, the cable 39 is paid off by means of the winch 38, so that the undercarriage starts to travel backwards slowly and the whole combination starts to hinge around the shaft 5 until the floating bodies 11 are in the water, as shown in FIG. 1.

Now the undercarriage 8 is allowed to travel further downwards over the framework 6 and the part 7 until at a certain moment the stern of the boat 10 will enter the water and the boat 10 will start to float on the water for a large part. Then the buoyancy of the floating bodies 11 is reduced, so that the whole combination of framework 6 and telescopic part 7 will still further hinge to the left, as seen in FIG. 1, so that the free end of the telescopic part 7 will hinge further away from the boat and the boat will come to lie entirely free in the water. Then the connection between the boat and the support 30 can be undone.

The boat can sail away and subsequently the empty undercarriage 8 is drawn up by means of the winch 38 and the cable 39. The telescopic part 7 is slid into the framework 6, the floating bodies 11 are removed, after which approximately the position as shown in FIG. 2, is reached.

To take the boat out of the water and back on the undercarriage, the process is reversed, so that first the buoyancy of the floating bodies 11 is as small as possible when the empty undercarriage is taken down, whereas after the connection between the undercarriage and the boat has been established, the buoyancy of the floating bodies 11 is increased to take the boat out of the water, at least at its front end.

As explained above, it is possible in the case that the floating bodies 11 are carried out in the way as shown in FIG. 6, that buoyancy is obtained by pumping air into the air bags 22, whereas the buoyancy can be reduced by emptying the air bags. By connecting the bags 22 with hoses running to an air pump set up near the motor vehicle, it is possible to adjust the buoyancy from ashore, by means of e.g. a control valve or a three-way tap.

As said above, the hinging shaft 5 may also be mounted on a fixed support on the bank, in which case it will of course be necessary to provide supports for the front end of the framework 6 in approximately its horizontal position.

When it is required that no parts project beyond the bank when the boat is on the shore, the hinging shaft 5 may be mounted on an approximately horizontally mobile slide. The displacement of the slide can take place e.g. by means of a winch and a somewhat oblique position of the slide, as has been described for the travelling of the undercarriage 8.

Furthermore it will be obvious that mechanical means can be used for the displacement of the telescopic part 7 in the framework 6 as well. This will be especially the case when the device is carried out heavily, e.g. for use at a shipyard.

It is obvious that the embodiment shown in the drawing and described above only serves to explain the invention, as many construction modifications can be applied without leaving its scope.

Some variations have already been given in the above, and the possibility is pointed at that the telescopic part can be separated into two parts, so that a telescopic construction is obtained with which even greater horizontal and/or vertical distances can be covered.

I claim:

1. Mobile or fixed boat slipway apparatus, comprising a framework having means for supporting a boat, said framework supported for pivotal movement between a substantially horizontal position when a boat is supported thereby and an inclined position for facilitating the launching or landing a boat from the slipway into and out of the water, said framework mounted to be freely pivotable around a support shaft and including a slide mounted for telescopic movement in a longitudinal direction along the length of said framework, said telescopic slide having an outer end portion which is projectable outwardly from the framework, at least one buoyant element for supporting said end portion of said slide from the water, and means for selectively adjusting the buoyant force of said element so that said end portion of said slide may be submerged in the water when a boat is launched or taken out of the water, said slide including means supporting an undercarriage for a boat mounted to travel longitudinally along said framework in telescopic relation thereto, said undercarriage supported on said framework by means of at least two pairs of spaced apart flanged rollers for guiding said undercarriage against substantial lateral deflection with respect to said framework, said undercarriage and said framework including means for restraining said undercarriage against displacement normal and away from said framework during telescopic movement thereon.

2. Apparatus according to claim 1, including a plurality of bouyant elements with at least one element mountable on each side of said telescopic slide.

3. Apparatus according to claim 2, wherein each said bouyant element comprises at least one inflatable bag.

4. Apparatus according to claim 3, including at least one bag on each side of said slide secured to a shaft, which projects laterally outward thereof.

5. Apparatus according to claim 3, including means for equalizing the air pressure in said bags on opposite sides of said slide.

6. Apparatus according to claim 1, wherein said framework includes a plurality of U-shaped members, said members having legs aligned in parallel with each other and connected for sliding telescopic movement therebetween.

7. Apparatus according to claim 6, wherein said telescopic slide includes a pair of longitudinally extending tubular profiles or side legs connected with each other by a plurality of transversely extending cross-members at spaced apart intervals longitudinally of said legs to form rungs of a ladder.

* * * * *